(12) United States Patent
Chen et al.

(10) Patent No.: US 11,146,084 B2
(45) Date of Patent: Oct. 12, 2021

(54) CAR CHARGER WITH CABLE AND LED ACTIVATED WHEN DEVICES ARE CONNECTED TO CONNECTORS

(71) Applicant: Superior Communications, Inc., Irwindale, CA (US)

(72) Inventors: George Chen, Chatsworth, CA (US); Samuel Sentosa, Rancho Cucamonga, CA (US); David Su, Montebello, CA (US)

(73) Assignee: Superior Communications, Inc., Irwindale, CA (US)

( * ) Notice: Subject to any disclaimer, the term of this patent is extended or adjusted under 35 U.S.C. 154(b) by 469 days.

(21) Appl. No.: 15/669,781

(22) Filed: Aug. 4, 2017

(65) Prior Publication Data

US 2018/0069413 A1    Mar. 8, 2018

Related U.S. Application Data

(60) Provisional application No. 62/383,328, filed on Sep. 2, 2016.

(51) Int. Cl.
| | |
|---|---|
| *H02J 7/00* | (2006.01) |
| *H01R 31/06* | (2006.01) |
| *H01R 13/717* | (2006.01) |
| *H05B 45/00* | (2020.01) |
| *H01R 31/02* | (2006.01) |
| *H01R 24/62* | (2011.01) |

(52) U.S. Cl.
CPC ........ *H02J 7/0047* (2013.01); *H01R 13/7172* (2013.01); *H01R 31/065* (2013.01); *H02J 7/00* (2013.01); *H02J 7/0045* (2013.01); *H05B 45/00* (2020.01); *H01R 13/7175* (2013.01); *H01R 24/62* (2013.01); *H01R 31/02* (2013.01); *H01R 2201/26* (2013.01); *H02J 7/0042* (2013.01); *H02J 7/0048* (2020.01)

(58) Field of Classification Search
CPC .. H02J 7/0047; H02J 7/0045; H01R 13/7172; H01R 31/065; H05B 45/00
USPC ...................................................... 320/107
See application file for complete search history.

(56) References Cited

U.S. PATENT DOCUMENTS 4,006,396 A * 2/1977 Bogut .................. H02J 7/0091
                                                    320/125
4,173,733 A * 11/1979 Sugalski ............... H02J 7/0003
                                                    320/110
(Continued)

*Primary Examiner* — John T Trischler
(74) *Attorney, Agent, or Firm* — Snell & Wilmer L.L.P.

(57) ABSTRACT

A power sensing and indication circuit includes a first device connector for charging a first device and having a first pin and a second pin, the first pin of the first device connector being connected to an output voltage port of a controller. The power sensing and indication circuit includes a first amplifier. The first amplifier has an inverting input port, a non-inverting input port and an output port. The power sensing and indication circuit includes a first set of multiple photodiodes for emitting light of a first color and a second set of multiple photodiodes for emitting light of a second color. The power sensing and indication circuit includes at least one of a transistor or a digital circuit to cause the first set of multiple diodes to emit light of the first color or the second set of multiple photodiodes to emit light of the second color.

20 Claims, 17 Drawing Sheets

(56) References Cited

U.S. PATENT DOCUMENTS

| | | | | |
|---|---|---|---|---|
| 4,896,120 A * | 1/1990 | Kamil | H03F 3/085 | 128/902 |
| 4,906,055 A * | 3/1990 | Horiuchi | G01R 15/04 | 327/77 |
| 5,105,180 A * | 4/1992 | Yamada | G01R 15/04 | 320/DIG. 21 |
| 5,734,254 A * | 3/1998 | Stephens | H02J 50/80 | 320/106 |
| 6,095,661 A * | 8/2000 | Lebens | H05B 45/50 | 362/184 |
| 6,305,818 B1 * | 10/2001 | Lebens | H05B 45/37 | 362/184 |
| 6,488,390 B1 * | 12/2002 | Lebens | H04B 10/502 | 362/231 |
| 6,526,293 B1 * | 2/2003 | Matsuo | H02J 7/0036 | 455/566 |
| 6,808,287 B2 * | 10/2004 | Lebens | H05B 45/50 | 362/184 |
| 6,809,498 B2 * | 10/2004 | Nakamura | H02M 3/07 | 320/108 |
| 6,956,487 B2 * | 10/2005 | Herrmann | H02J 7/0047 | 340/636.12 |
| 7,186,000 B2 * | 3/2007 | Lebens | H04B 10/564 | 362/184 |
| 7,393,119 B2 * | 7/2008 | Lebens | H05B 45/395 | 362/205 |
| 7,550,951 B2 * | 6/2009 | Lai | H02J 7/0047 | 320/162 |
| 8,040,071 B2 * | 10/2011 | Lin | H05B 45/44 | 315/224 |
| 8,054,004 B2 * | 11/2011 | Yang | H05B 45/3725 | 315/291 |
| 8,063,606 B2 * | 11/2011 | Veselic | H02J 7/045 | 320/119 |
| 8,143,848 B2 * | 3/2012 | Navid | H02J 7/0045 | 320/113 |
| 8,378,630 B2 * | 2/2013 | Navid | A63F 13/90 | 320/113 |
| 8,410,711 B2 * | 4/2013 | Lin | H05B 45/44 | 315/224 |
| 8,487,554 B2 * | 7/2013 | Sauerlaender | H05B 45/44 | 315/308 |
| 8,536,832 B2 * | 9/2013 | Navid | H01R 31/06 | 320/113 |
| 8,541,947 B2 * | 9/2013 | Hodgson | B60Q 3/66 | 315/77 |
| 8,569,956 B2 * | 10/2013 | Shteynberg | H05B 45/50 | 315/123 |
| 8,633,675 B2 * | 1/2014 | Navid | H02J 7/0044 | 320/113 |
| 8,653,789 B2 * | 2/2014 | Chen | H02J 7/00 | 320/111 |
| 8,836,282 B2 * | 9/2014 | Chen | H02J 7/00 | 320/111 |
| 8,884,553 B2 * | 11/2014 | Hai | H05B 45/24 | 315/312 |
| 9,055,641 B2 * | 6/2015 | Shteynberg | H05B 45/20 | |
| 9,060,401 B2 * | 6/2015 | Shteynberg | H05B 45/10 | |
| 9,167,853 B2 * | 10/2015 | Xiang | A24F 47/008 | |
| 9,174,121 B2 * | 11/2015 | Navid | H02J 7/0044 | |
| 9,426,856 B2 * | 8/2016 | Shteynberg | H05B 45/20 | |
| 9,472,955 B2 * | 10/2016 | Jones | H05B 47/11 | |
| 9,538,598 B2 * | 1/2017 | Zhang | H05B 45/10 | |
| 9,569,949 B1 * | 2/2017 | Jones | H02J 7/0044 | |
| 9,579,987 B2 * | 2/2017 | Penilla | G06Q 30/0259 | |
| 9,583,968 B2 * | 2/2017 | Salter | H02J 50/70 | |
| 9,705,344 B2 * | 7/2017 | Navid | H02J 7/0045 | |
| 9,780,600 B2 * | 10/2017 | Sentosa | H02J 50/12 | |
| 9,820,349 B2 * | 11/2017 | Shteynberg | H05B 45/46 | |
| 9,960,621 B2 * | 5/2018 | Ziegenfuss | H02J 7/087 | |
| 9,960,622 B2 * | 5/2018 | Ziegenfuss | H02J 7/00 | |
| 10,037,743 B2 * | 7/2018 | Zeine | G06F 3/1423 | |
| 10,135,271 B2 * | 11/2018 | Miller | H02J 7/0047 | |
| 10,141,755 B2 * | 11/2018 | Miller | H02J 7/0029 | |
| 10,173,604 B2 * | 1/2019 | Salter | B60Q 3/64 | |
| 10,223,999 B2 * | 3/2019 | Zeine | G06F 1/266 | |
| 10,231,301 B2 * | 3/2019 | Shteynberg | H05B 45/10 | |
| 10,326,292 B2 * | 6/2019 | Zeisler | H02J 7/0045 | |
| 10,357,063 B1 * | 7/2019 | Fornarelli | H01M 2/1055 | |
| 10,616,966 B2 * | 4/2020 | Shteynberg | H05B 45/36 | |
| 10,693,303 B2 * | 6/2020 | Miller | H02J 7/0021 | |
| 2003/0095406 A1 * | 5/2003 | Lebens | H05B 45/20 | 362/231 |
| 2004/0036620 A1 * | 2/2004 | Herrmann | G01R 31/3842 | 340/636.12 |
| 2005/0040773 A1 * | 2/2005 | Lebens | H05B 45/37 | 315/291 |
| 2006/0038803 A1 * | 2/2006 | Miller | H05B 45/37 | 345/204 |
| 2007/0133199 A1 * | 6/2007 | Lebens | H05B 45/22 | 362/157 |
| 2008/0136373 A1 * | 6/2008 | Lai | H02J 7/045 | 320/128 |
| 2008/0150480 A1 * | 6/2008 | Navid | H01R 31/06 | 320/113 |
| 2008/0231229 A1 * | 9/2008 | Aradachi | H02J 7/0047 | 320/107 |
| 2008/0278119 A1 * | 11/2008 | Veselic | H02J 7/0022 | 320/161 |
| 2009/0058356 A1 * | 3/2009 | Lee | H02J 7/0027 | 320/106 |
| 2009/0079264 A1 * | 3/2009 | Minami | G06F 1/266 | 307/44 |
| 2009/0284174 A1 * | 11/2009 | Sauerlander | H05B 45/24 | 315/294 |
| 2010/0159317 A1 * | 6/2010 | Taghikhani | H01M 2/1083 | 429/120 |
| 2011/0006684 A1 * | 1/2011 | Hodgson | H05K 1/0284 | 315/77 |
| 2011/0095728 A1 * | 4/2011 | Chen | H02J 7/00 | 320/162 |
| 2011/0109245 A1 * | 5/2011 | Lin | H05B 45/37 | 315/294 |
| 2011/0133658 A1 * | 6/2011 | Sauerlaender | H05B 45/44 | 315/192 |
| 2011/0316473 A1 * | 12/2011 | Yen | H02J 7/027 | 320/107 |
| 2012/0081009 A1 * | 4/2012 | Shteynberg | H05B 45/46 | 315/122 |
| 2012/0169286 A1 * | 7/2012 | Navid | H02J 7/0044 | 320/113 |
| 2012/0206101 A1 * | 8/2012 | Shilimkar | H02J 7/0027 | 320/112 |
| 2012/0217878 A1 * | 8/2012 | Lin | H05B 45/37 | 315/122 |
| 2012/0217929 A1 * | 8/2012 | Navid | H01R 31/06 | 320/113 |
| 2013/0038275 A1 * | 2/2013 | Chen | H02J 9/007 | 320/107 |
| 2013/0099689 A1 * | 4/2013 | Hai | H05B 45/24 | 315/201 |
| 2013/0113414 A1 * | 5/2013 | Chen | H02J 7/0044 | 320/107 |
| 2013/0300368 A1 * | 11/2013 | Navid | A63F 13/02 | 320/115 |
| 2013/0334881 A1 * | 12/2013 | Jones | H02J 4/00 | 307/23 |
| 2014/0125230 A1 * | 5/2014 | Shteynberg | H05B 45/10 | 315/122 |
| 2014/0139112 A1 * | 5/2014 | Shteynberg | H05B 45/46 | 315/122 |
| 2014/0152178 A1 * | 6/2014 | Hodgson | B60Q 3/74 | 315/77 |
| 2014/0159649 A1 * | 6/2014 | Chen | H02J 7/00 | 320/107 |
| 2014/0235359 A1 * | 8/2014 | Navid | A63F 13/02 | 463/47 |

(56) References Cited

U.S. PATENT DOCUMENTS

| | | | |
|---|---|---|---|
| 2014/0275874 A1* | 9/2014 | Haisley | A61B 5/0002 600/323 |
| 2015/0015186 A1* | 1/2015 | Xiang | H02J 7/045 320/107 |
| 2015/0137747 A1* | 5/2015 | Salter | B60N 3/14 320/108 |
| 2015/0257226 A1* | 9/2015 | Shteynberg | H05B 45/20 315/186 |
| 2015/0380977 A1* | 12/2015 | Sentosa | H02J 50/12 320/108 |
| 2016/0031338 A1* | 2/2016 | Penilla | B60L 1/003 320/109 |
| 2016/0089992 A1* | 3/2016 | Le | H02J 7/00047 320/107 |
| 2016/0141903 A1* | 5/2016 | Chen | H02J 7/00 320/111 |
| 2016/0190830 A1* | 6/2016 | Kuhlmann | H02J 7/0026 320/116 |
| 2016/0226274 A1* | 8/2016 | Navid | A63F 13/02 |
| 2016/0268731 A1* | 9/2016 | Ziegenfuss | H02J 7/0045 |
| 2016/0268827 A1* | 9/2016 | Ziegenfuss | H02J 7/00041 |
| 2016/0300547 A1* | 10/2016 | El-Rukby | G06Q 20/327 |
| 2016/0301243 A1* | 10/2016 | Zeine | H02J 7/007182 |
| 2016/0301256 A1* | 10/2016 | Zeine | G06F 3/14 |
| 2016/0302278 A1* | 10/2016 | Zhang | H05B 45/46 |
| 2016/0380461 A1* | 12/2016 | Jones | H02J 4/00 307/20 |
| 2017/0012445 A1* | 1/2017 | Takemura | H01M 10/441 |
| 2017/0012448 A1* | 1/2017 | Miller | H02J 7/0031 |
| 2017/0034879 A1* | 2/2017 | Shteynberg | H05B 45/10 |
| 2017/0127726 A1* | 5/2017 | Xiang | A24F 47/008 |
| 2017/0225635 A1* | 8/2017 | Obayashi | F02N 11/108 |
| 2017/0267117 A1* | 9/2017 | Grider | H02J 7/0047 |
| 2018/0056887 A1* | 3/2018 | Salter | H02J 7/025 |
| 2018/0110099 A1* | 4/2018 | Shteynberg | H05B 45/37 |
| 2018/0233934 A1* | 8/2018 | Miller | H02J 7/0031 |
| 2018/0254649 A1* | 9/2018 | Zeisler | H02J 7/085 |
| 2018/0366085 A1* | 12/2018 | Zeine | H02J 7/045 |
| 2019/0089172 A1* | 3/2019 | Miller | H02J 7/007 |
| 2019/0197984 A1* | 6/2019 | Zeine | H02J 7/025 |
| 2019/0200423 A1* | 6/2019 | Shteynberg | H05B 45/10 |
| 2020/0111926 A1* | 4/2020 | Shr | H01L 31/02008 |
| 2020/0196419 A1* | 6/2020 | Johnson | H02J 7/027 |
| 2020/0280219 A1* | 9/2020 | Laughery | H02J 7/00045 |

\* cited by examiner

CAR CHARGER WITH CABLE AND LED ACTIVATED WHEN DEVICES ARE CONNECTED TO CONNECTORS

CROSS-REFERENCE TO RELATED APPLICATIONS

This application claims priority to and the benefit of U.S. Provisional Patent Application No. 62/383,328 titled "LED CABLE AND CAR CHARGER," filed on Sep. 2, 2016, and the entirety of which is hereby incorporated by reference herein.

BACKGROUND

1. Field

This specification relates to a system, device and circuit for sensing and providing an indication of a charge in a device.

2. Description of the Related Art

Some chargers, such as AC adaptors, car vehicle charger adaptors and other charging cables, have one or more charging indicator lights to indicate to the user when the adaptor is charging a personal device, such as a smartphone, a laptop or other personal device. For example, an AC adaptor for a laptop may have a light indicator that turns on when the AC adaptor is plugged into an electrical socket. The light indicator of the AC adaptor for the laptop is on whenever the AC adaptor is plugged into the electrical socket regardless of whether the AC adaptor is attached to the laptop. Thus, the charging indicator lights indicate that the charger is providing power to the personal device and do not indicate the power level of the personal device.

Moreover, the charging indicator lights do not indicate to the user when the personal device is fully charged, low on power, and/or operating with enough power. A personal device, however, may have an indicator that shows the different power levels of the personal device. But, the personal device may be located in an inconvenient location that is out of the field of view of the user.

Accordingly, there is a need for a device that conveniently shows the power level of the personal device.

SUMMARY

In general, one aspect of the subject matter described in this specification is embodied in a power sensing and indication circuit. The power sensing and indication circuit includes a first device connector for charging a first device and having a first pin and a second pin, the first pin of the first device connector being connected to an output voltage port of a controller. The power sensing and indication circuit includes a first amplifier. The first amplifier has an inverting input port, a non-inverting input port and an output port. The non-inverting input port of the first amplifier is connected to the second pin of the first device connector. The power sensing and indication circuit includes a first set of multiple photodiodes for emitting light of a first color and second set of multiple photodiodes for emitting light of a second color. The power sensing and indication circuit includes at least one of a transistor or a digital circuit configured to cause the first set of multiple diodes to emit light of the first color or the second set of multiple photodiodes to emit light of the second color.

These and other embodiments may optionally include one or more of the following features. The non-inverting input port may have a first voltage and the inverting input port may have a second voltage. The first set of multiple photodiodes may emit light of the first color when the first voltage is greater or equal to the second voltage. The second set of multiple photodiodes may emit light of the second color when the first voltage is less than the second voltage.

The power sensing and indication circuit may include a second device connector for charging a second device. The second device connector may have a first pin and a second pin. The power sensing and indication circuit may include a second amplifier. The second amplifier may have an inverting input port, a non-inverting input port and an output port. The non-inverting input port of the second amplifier may be connected to the second pin of the second device connector. The non-inverting input port of the first amplifier may have a first voltage and the inverting input port of the first amplifier may have a second voltage. The non-inverting input port of the second amplifier may have a third voltage and the inverting input port of the second amplifier may have a second voltage. The power sensing and indication circuit may include a transistor that may be connected to the output port of the first amplifier and the output port of the second amplifier.

The first set of multiple photodiodes may emit light of the first color when the first voltage is greater than the second voltage and the third voltage is greater than the second voltage. The second set of multiple photodiodes may emit light of the second color when at least one of the first voltage or the third voltage is less than the second voltage. The second voltage may be 13.5 mV.

At least one of the first device connector or the second device connector may be a universal serial bus (USB) connector. At least one of the first device connector or the second device connector may be a lightning USB connector, a micro-USB connector or a USB Type-C (USB-C) connector. A cable may connect the lightning USB Connector, the micro-USB connector or the USB-C connector with the controller.

In another aspect, the subject matter is embodied in a power sensing and indication device for charging devices. The power sensing and indication device includes a controller for providing a charge to a device and having an input voltage port and an output voltage port. The power sensing and indication device includes a power sensing and indication circuit. The power sensing and indication circuit includes a device connector for charging the device and having a first pin and a second pin. The first pin of the first device connector is connected to the output voltage port of the controller. The power sensing and indication circuit includes an amplifier having an inverting input port, a non-inverting input port and an output port. The non-inverting input port of the amplifier is connected to the second pin of the device connector. The power sensing and indication circuit includes a first set of multiple photodiodes for emitting light of a first color and a second set of multiple photodiodes for emitting light of a second color. The power sensing and indication circuit includes a transistor that is configured to cause the first set of multiple photodiodes to emit light of the first color or the second set of multiple photodiodes to emit light of the second color.

BRIEF DESCRIPTION OF THE DRAWINGS

Other systems, methods, features, and advantages of the present invention will be apparent to one skilled in the art

DETAILED DESCRIPTION

Disclosed herein are systems, devices and circuits for sensing and providing an indication of a charge in devices. Particular embodiments of the subject matter described in this specification may be implemented to realize one or more of the following advantages.

A power sensing and indication circuit provides an indication of a charge of an attached device. The power sensing and indication circuit is configurable to provide one or more visual indications to a user to indicate the amount of power in an attached device. For example, a personal device, such as a smart phone, may be attached to charger that has the power sensing and indication circuit, and when the personal device is low on power, a light on the charger may indicate that the personal device is low on power. When the personal device receives enough power from the charger so that the personal device is no longer low on power, the charger may indicate that the personal device is not low on power. And, when the personal device is fully charged, the charger may indicate that the personal device is fully charged. The charger may indicate the power level of the device even when the device does not otherwise provide an indication of the power level. Moreover, the indicator of the charger may be positioned in the user's field of view so that a user does not have to divert their attention, e.g., away from the road, to the personal device.

Other benefits and advantages include allowing the charger to display different power levels of the devices, such as a low power level, a charging power level, and/or a fully charged power level. The power sensing and indication circuit may use different colors to represent the different power levels or may use different types of indications, such as a flashing indicator, to represent the different power levels.

Another benefit and advantage of the power sensing and indication circuit is that it supports different device connectors, such as a universal serial bus (USB), a USB Type-C (USB-C), a lightning USB connector, or a micro-USB connector, that connect to different types of devices. This allows the charger to charge different types of devices and indicate the power levels of the device even if the device does not have an indicator that shows the power level of the device.

FIGS. 1A-1B, 2A-2B, 3A-3B and 4A-4B are circuit diagrams of a power sensing and indication circuit 100 for charging devices. The power sensing and indication circuit ("power sensing circuit") 100 of a charger includes one or more device connectors for charging one or more devices, such as a smartphone, a tablet or other personal device, one or more amplifiers, e.g., amplifiers 104, 106, one or more transistors, e.g., transistors 118a-b, or a digital circuit, a diode 109 and multiple light-emitting photo diodes, e.g., the light-emitting photodiodes (LEDs) 108, 110.

Figure 9A:
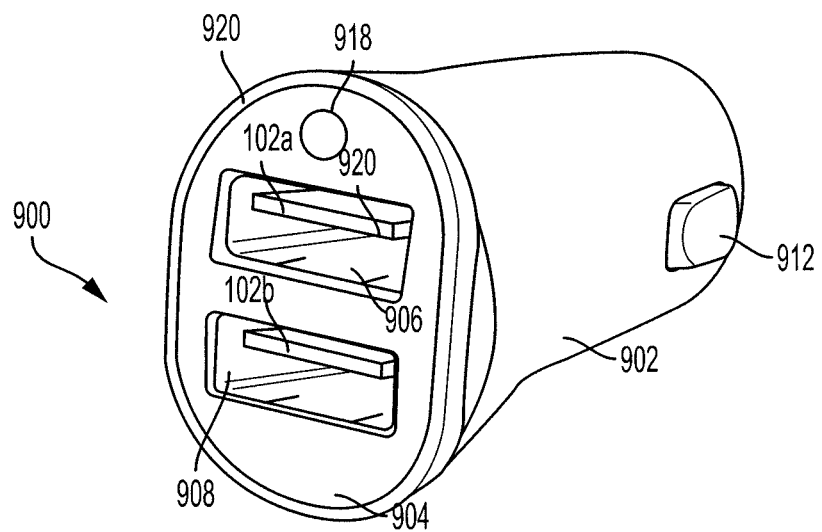
FIG. 9A shows a front perspective view of an example car charging device according to an aspect of the invention.
Figure 9B:
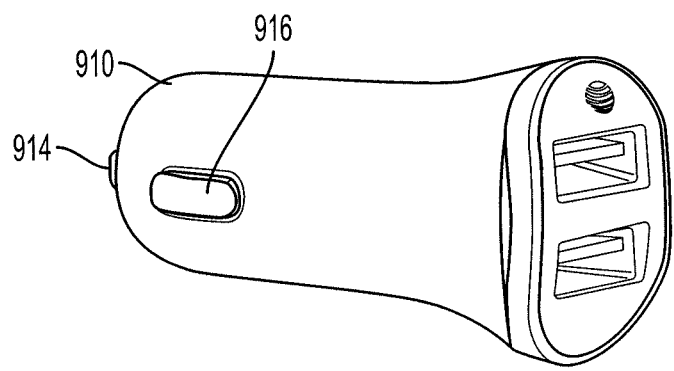
FIG. 9B shows a side perspective view of the example car charging device according to an aspect of the invention.

The power sensing circuit 100 may be applied to any type of charger, e.g., a car charging device 900 of FIGS. 9-10. When a device is connected to the car charging device 900 and the charge of the device is less than a threshold value, e.g., less than 95% charged, one or more LEDs emit a first color, such as a white color, that indicates that the charge of the connected device is less than the threshold value and is not fully charged. When the charge is greater than or equal to the threshold value, e.g., greater than or equal to 95% charged, the one or more LEDs emit a second color, such as a blue color, that indicates that the connected device is fully charged. The threshold value for the charge of the device that causes the LEDs to emit a particular color of light may vary depending on the device. The threshold value may range from 85%-95% so that when the charge is less than the threshold value the one or more LEDs emit the first color, such as the white color, and when the charge is greater than or equal to the threshold value the one or more LEDs emit the second color, such as the blue color. In some implementations, the one or more LEDs emit a first color when the device connected is between 85%-100% charged, and a second color when the device connected is between 0%-84% charged. In some implementations, the one or more LEDs flash, blink or otherwise provide an indication to differentiate between the two ranges of charge.

The power sensing circuit 100 includes one or more device connectors, e.g., device connectors 102a-b. FIGS. 1B, 2B, 3B and 4B are circuit diagrams of the one or more device connectors that are included in the power sensing circuit 100 and attach to one or more devices. The one or more device connectors include one or more Universal Serial Bus (USB) connectors, e.g., Dual USB connector 102 of FIG. 1B or USB connector 204 of FIG. 2A, one or more lightning USB connectors, e.g., lightning USB connector 302 of FIG. 3B, a USB Type-C (USB-C) connector 202 of FIG. 2B and/or a micro USB connector 402 of FIG. 4B. The one or more device connectors may include a first device connector 102a and a second device connector 102b. The first device connector and the second device connector may be combined to form a single integrated connector. For example, a first device connector 102a may be integrated with a second device connector 102b to form the Dual USB connector 102. The first or second device connectors may be a lightning USB connector 302, a USB-C connector 202, a single USB connector 204 or a micro-USB connector 402.

Each of the one or more device connectors has multiple pins including a voltage input pin (V+), a ground pin (V−), and one or more data pins. The voltage pin (V+) may receive a charge from a charging device, e.g., a charge of 5 Volts (V)/4.8 Amps (A) for a Dual USB car charger or a Single USB and corded USB-C car charger or a charge of 5V/3.4 A for a Single USB and corded lightning/micro-USB car charger, to deliver the charge to a device connected to the device connector. The wattage of the charge from the charging device may vary. For example, the V1+ pin of the first device connector 102a delivers a charge to a first device that is connected to the first device connector 102a. The one or more data pins transfer data between the first device connector 102a and the first device, and may be connected to an automatic detection device 124. The automatic detection device 124 optimizes the charging speed. The automatic detection device 124 is described in U.S. Pat. Nos. 9,252,614 and 9,385,551 which are herein incorporated by reference. The ground pin (V−) may be connected to ground through one or more resistors.

The power sensing circuit 100 includes one or more amplifiers, e.g., amplifiers 104, 106. One or more amplifiers are connected to the one or more ground pins (V−) of the one or more device connectors. The non-inverting input port of each of the one or more amplifiers is connected to a respective ground pin of one of the one or more device connectors. The inverting input port of each of the one or more amplifiers 104, 106 is connected to a voltage divider 112 and the output voltage of the output pin (VR1) of the voltage divider 112 is the voltage at the inverting input port of the amplifiers. For example, the non-inverting input port (CS1) of the first amplifier 104 is connected to the ground pin of the first device connector 102a, and the non-inverting input port (CS2) of the second amplifier 106 is connected to the ground pin of the second device connector 102b. The voltages at the respective ground pins are the input voltages for the respective non-inverting input ports of the first amplifier 104 and the second amplifier 106. The inverting input port of the first amplifier 104 is connected to and in parallel with the voltage divider 112 and the inverting input port of the second amplifier 106. The output voltage of the voltage divider 112 is the input voltage of the inverting input ports of the first amplifier 104 and second amplifier 106. The voltage divider 112 may include two resistors, a first resistor having a resistance of 68,100 Ohms (Ω) and a second resistor with a resistance of 332Ω.

The power sensing circuit 100 includes a transistor that is connected to the output port of each of the one or more amplifiers. The transistor has a base terminal, a collector terminal and an emitter terminal. The base terminal of the transistor may be connected through one or more resistors to the output port of each of the one or more amplifiers. The transistor is configured to connect the collector terminal to the emitter terminal to allow current to flow through when there is a voltage and/or current that flows through the base terminal and out through the emitter terminal. For example, the base terminal of transistor 118 is connected to the output ports of the amplifiers 104 and 106 through resistors 120 and 122, respectively. When there is a charge at the base terminal of the transistor 118, the collector terminal and the emitter terminal of the transistor 118 is connected allowing a charge to flow through and illuminate the first set of LEDs 108 to emit a white light, otherwise, a charge flows through and illuminates the second set of LEDs 110 to emit a blue light. In some implementations, the power sensing circuit 100 includes a digital circuit, instead of a transistor, that controls the charge that flows through to illuminate the first set or the second set of LEDs 108, 110.

Figure 1A:
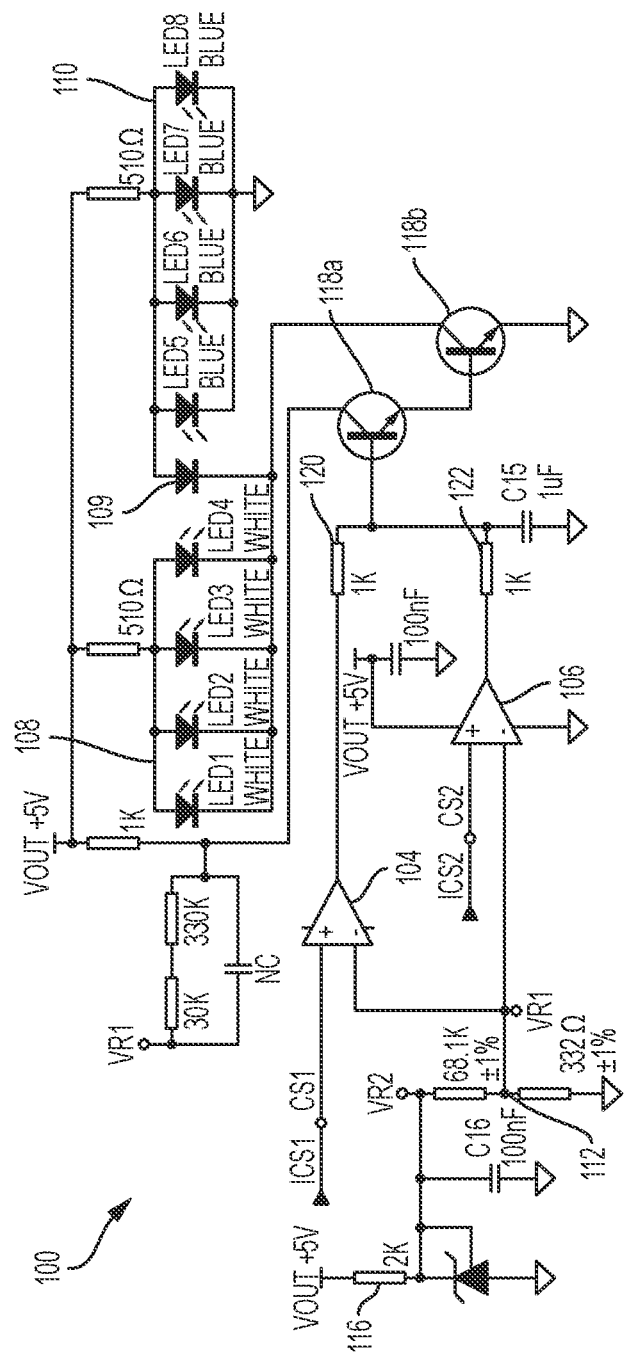
FIGS. 1A-1B show an example circuit diagram of a power sensing and indication circuit with a dual universal serial bus (USB) device connector according to an aspect of the invention.
Figure 1B:
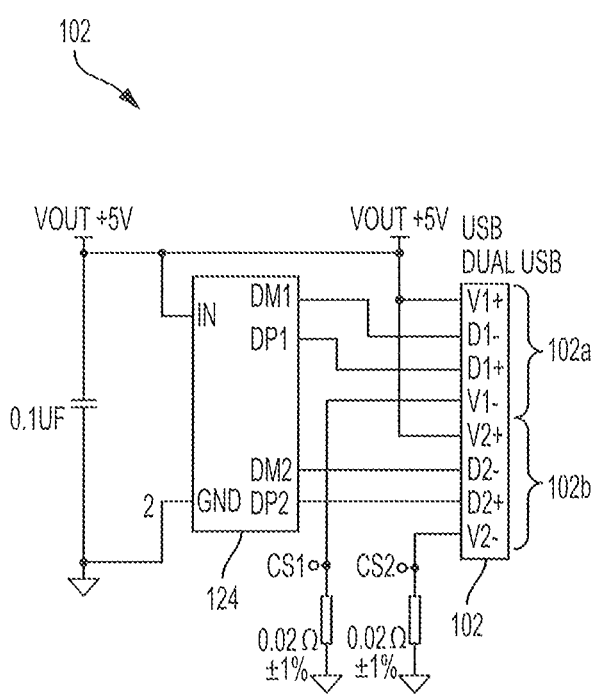
Figure 2A:
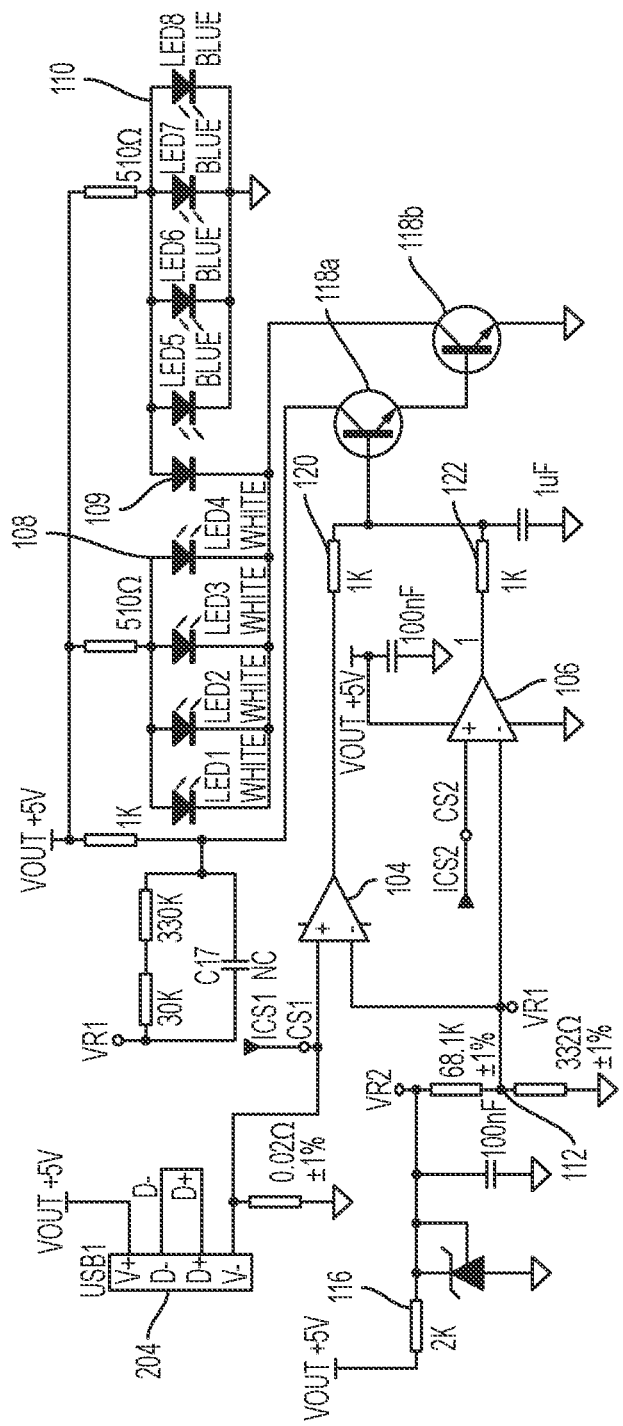
FIGS. 2A-2B show an example circuit diagram of a power sensing and indication circuit with a USB device connector and a USB Type-C device connector according to an aspect of the invention.
Figure 2B:
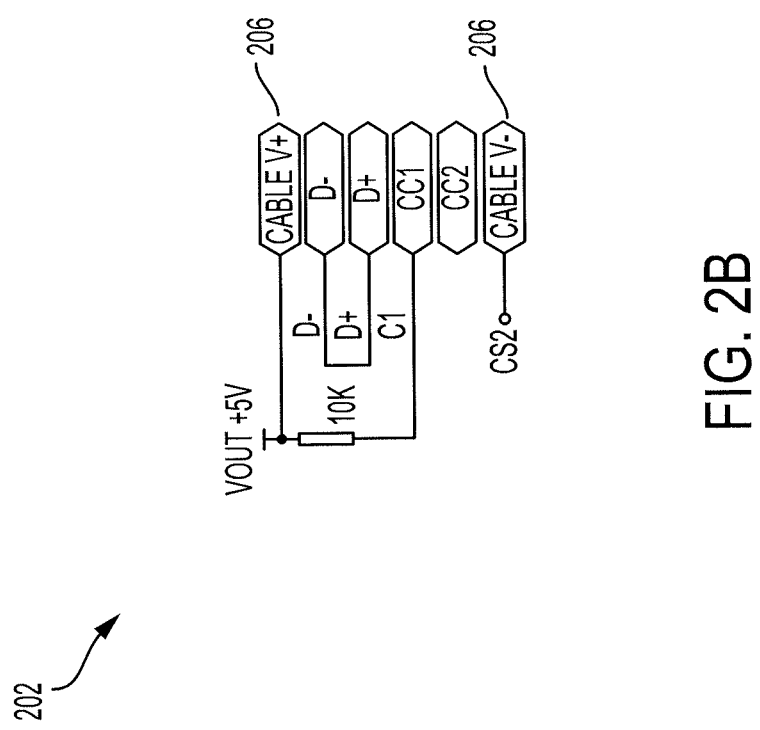
Figure 3A:
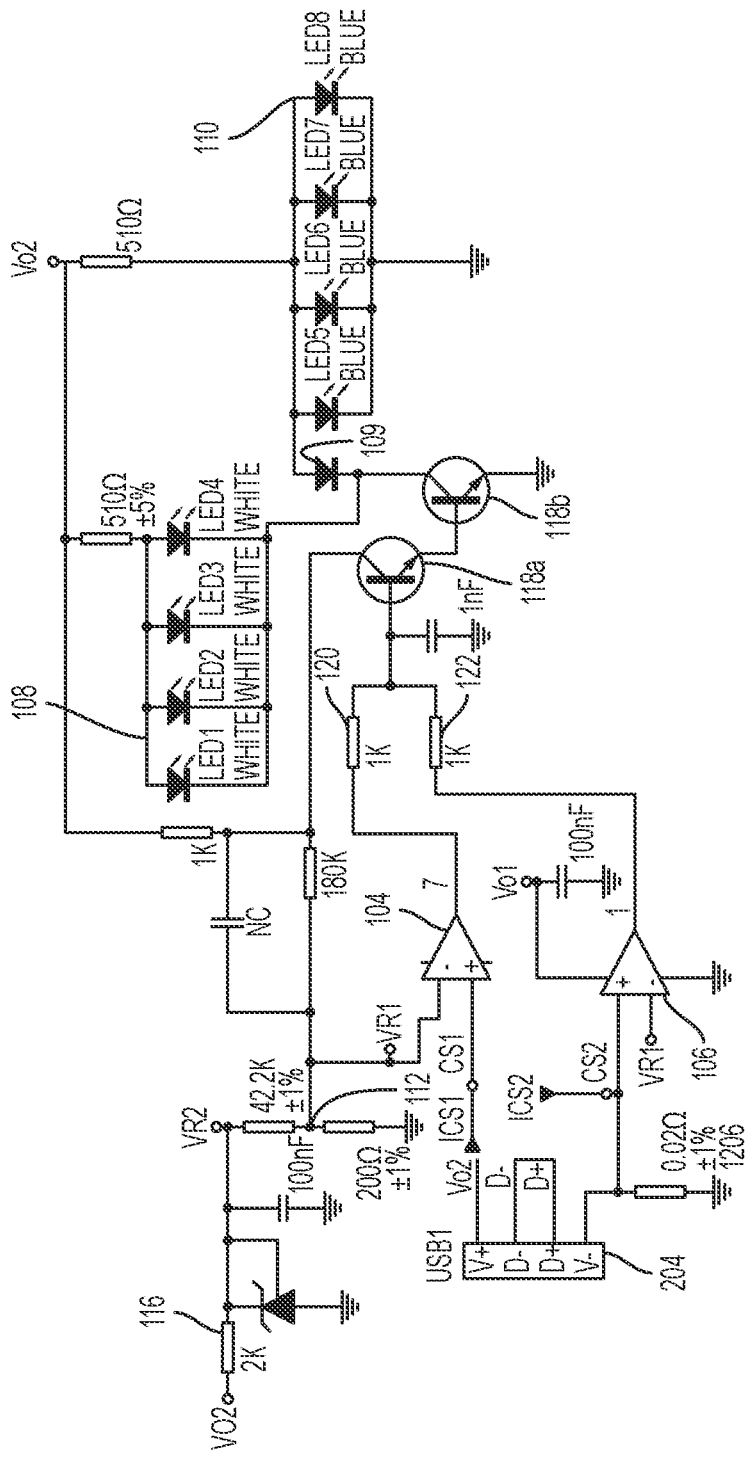
FIGS. 3A-3B show an example circuit diagram of a power sensing and indication circuit with a USB device connector and a lighting USB device connector according to an aspect of the invention.
Figure 3B:
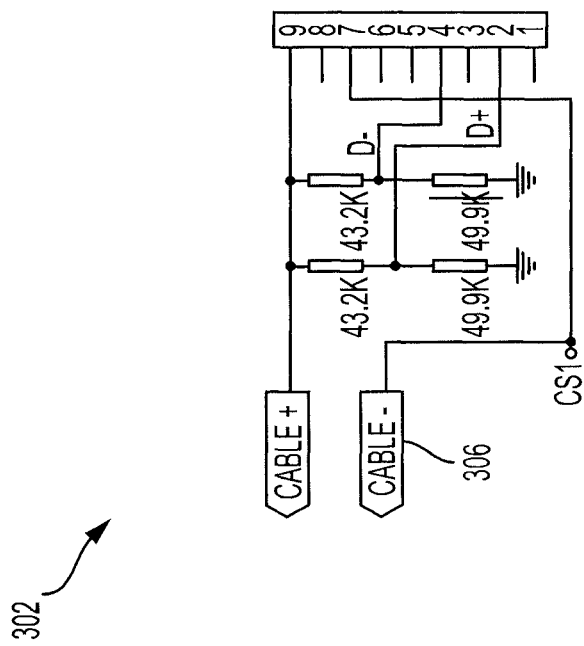
Figure 4A:
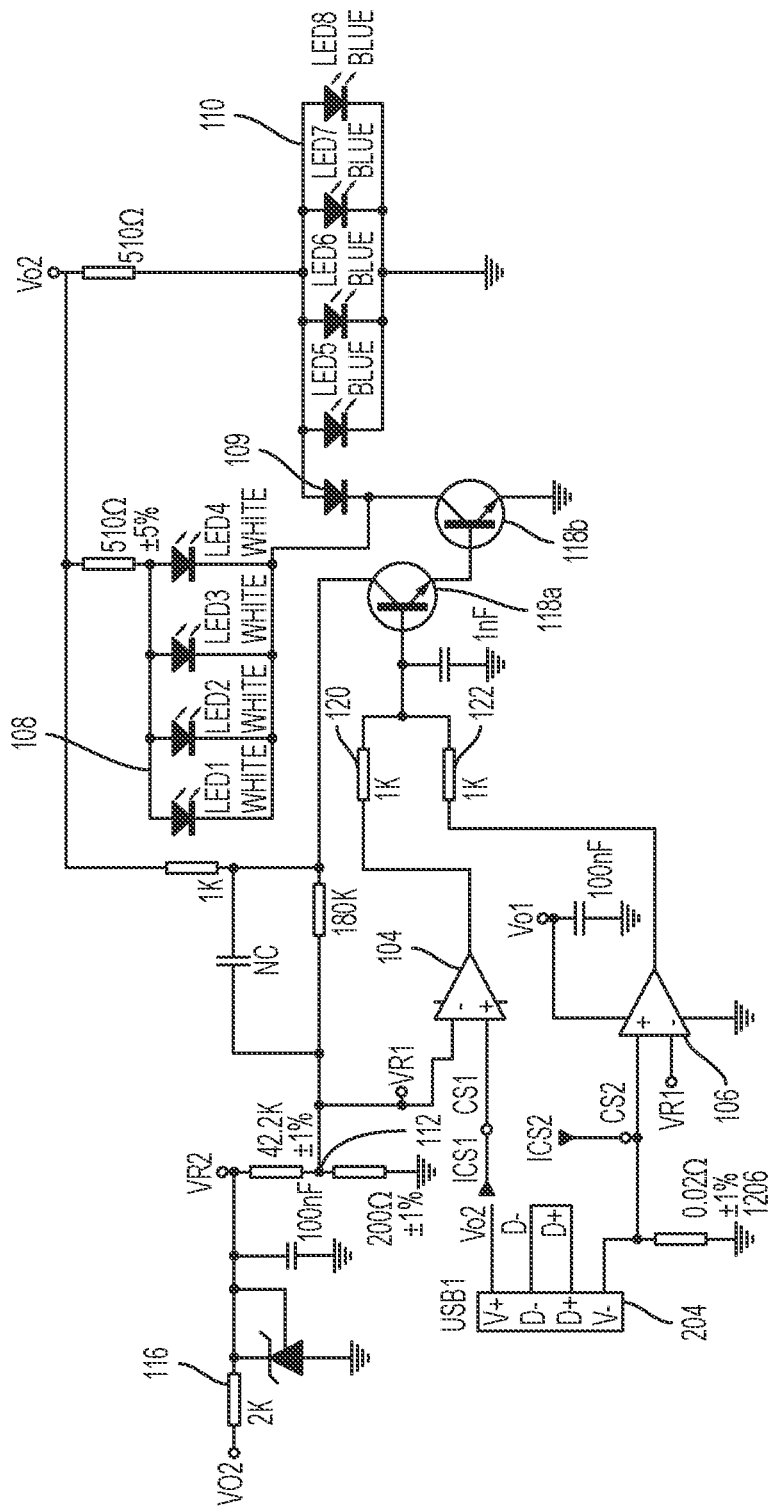
FIGS. 4A-4B show an example circuit diagram of a power sensing and indication circuit with a USB device connector and a micro-USB device connector according to an aspect of the invention.
Figure 4B:
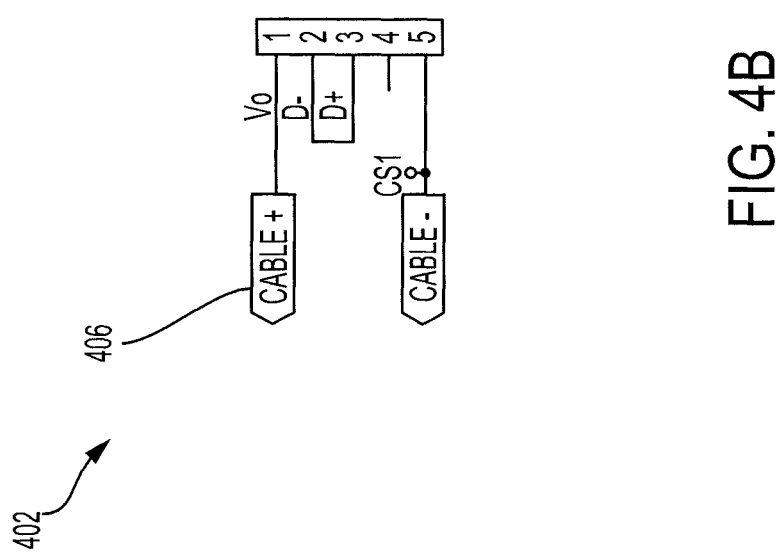
Figure 5:
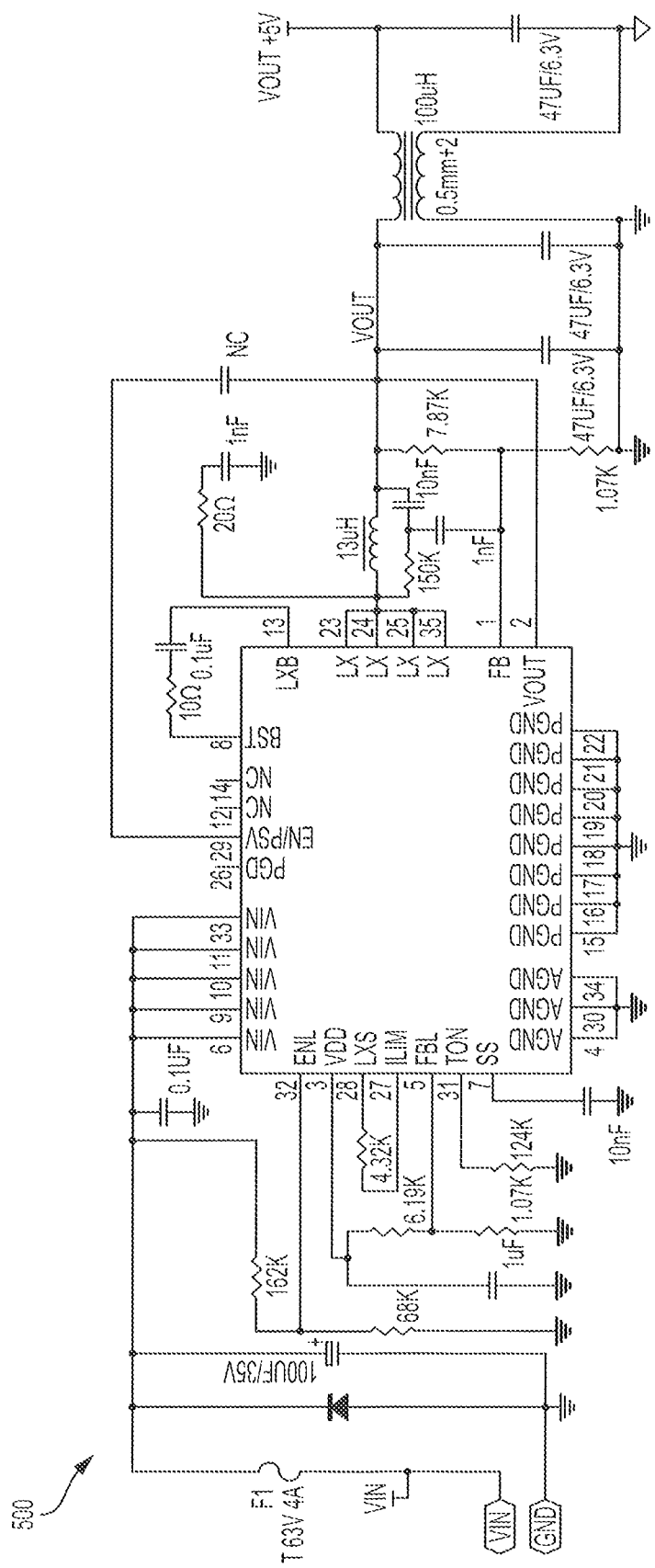
FIG. 5 shows an example circuit diagram of a controller that drives an electrical charge to the power sensing and indication circuit of FIG. 1 according to an aspect of the invention.
Figure 6:
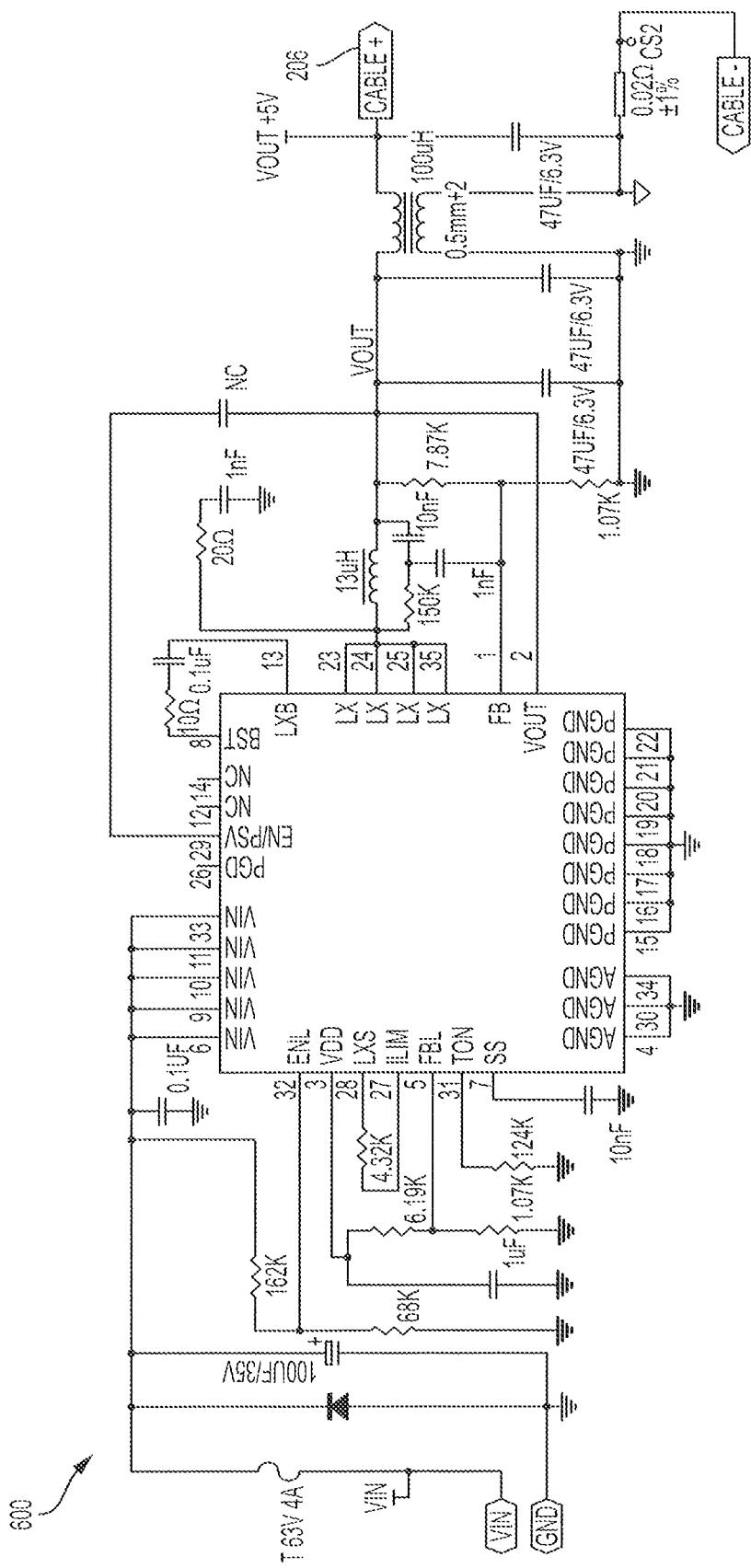
FIG. 6 shows an example circuit diagram of a controller that drives an electrical charge to the power sensing and indication circuit of FIG. 2 according to an aspect of the invention.
Figure 7:
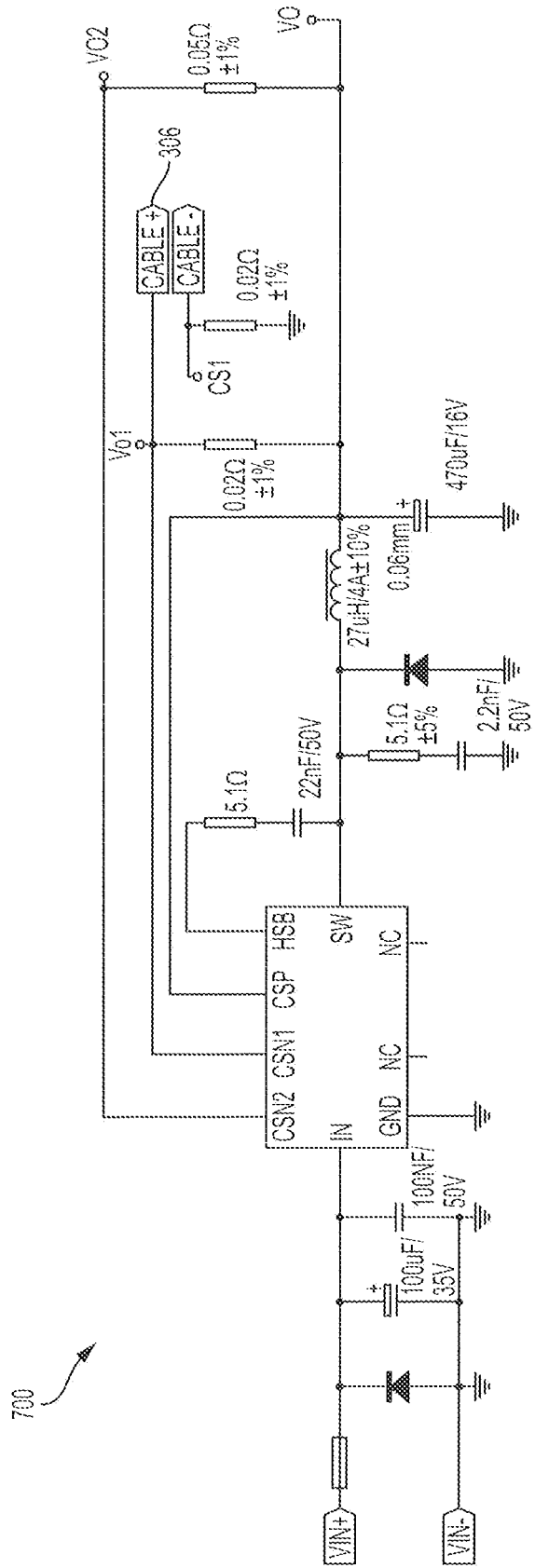
FIG. 7 shows an example circuit diagram of a controller that drives an electrical charge to the power sensing and indication circuit of FIG. 3 according to an aspect of the invention.
Figure 8:
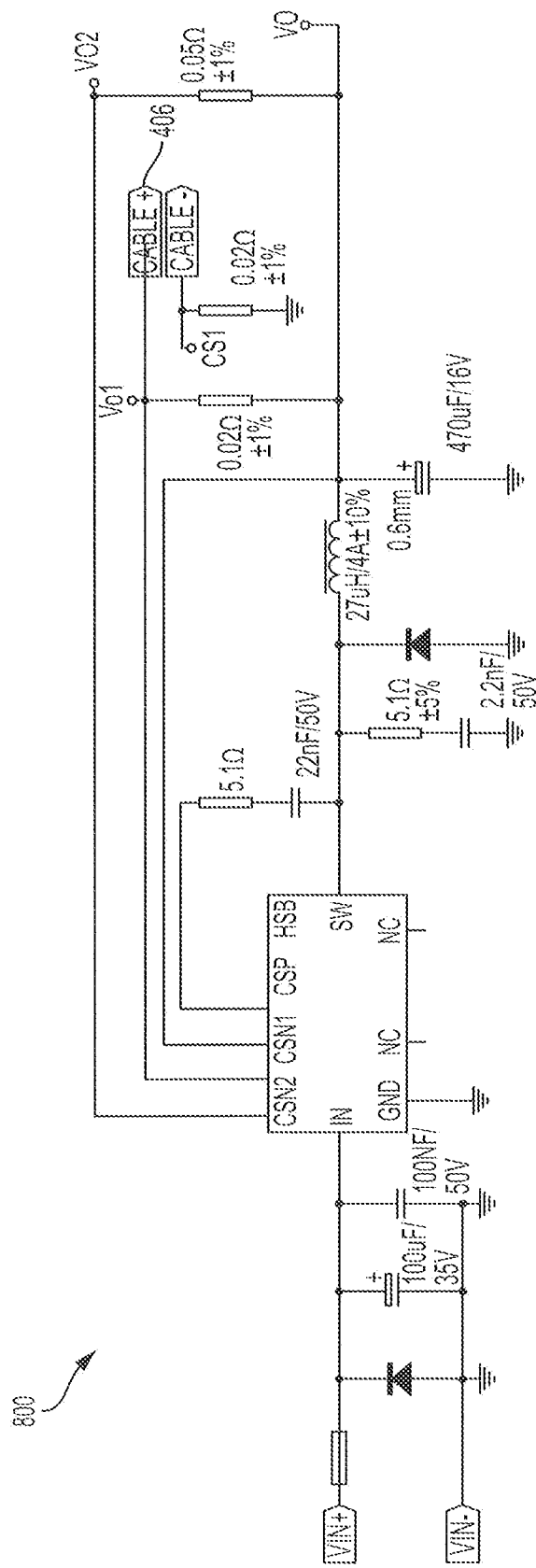
FIG. 8 shows an example circuit diagram of a controller that drives an electrical charge to the power sensing and indication circuit of FIG. 4 according to an aspect of the invention.

A controller, such as one of the controllers 500 of FIG. 5, 600 of FIG. 6, 700 of FIG. 7, 800 of FIG. 8, drives an electrical charge to the one or more devices connected to the one or more device connectors through the power sensing circuit 100. The controller has an input charge. The input charge at an input voltage port of the controller may be a charge of 5 Volts (V)/4.8 Amps (A) for a Dual USB car charger or a Single USB and corded USB-C car charger or a charge of 5V/3.4 A for a Single USB and corded lightning/micro-USB car charger, for example. The one or more output voltage ports of the controller are connected to the input pins of the device connector and/or the voltage divider. For example, the controller 500, 600, 700 or 800 drives a voltage of 5V to the voltage divider 112 through one or more resistors 116 that have a combined resistance of 2,000Ω. The resulting output voltage of the voltage divider 112 may have a charge of 13.5 millivolts (mV) that results from a controller 500, 600, 700 or 800 providing a charge of 5V through the one or more resistors 116 and out through the voltage divider 112 and into the inverting input ports of the amplifiers 104, 106.

The controller 500 drives a voltage to the input pins of the Dual USB connector 102. The controller 600 drives a voltage to the input pin of the USB-C connector 202 through one or more cables 206 and to the input pin of the USB connector 204. The controller 700 drives a voltage to the input pin of the lightning USB connector 302 through one or more cables 306 and to the input pin of the USB connector 204. The controller 800 drives a voltage to the input pin of the micro-USB connector 402 through one or more cables 406 and to the input pin of the USB connector 204.

When the voltage driven through the non-inverting input ports of the one or more amplifiers is greater than or equal to the voltage driven through the inverting input ports, a first set of photodiodes emit light of a first color. For example, when the voltage driven through the non-inverting input ports of the amplifiers 104, 106 is greater than the resulting output voltage of 13.5 mV that is outputted by the voltage divider 112, a first set of LEDs 108 turns on. The voltage at the non-inverting input ports being greater than the resulting output voltage of 13.5 mV indicates that the total charge of the attached first and second devices to the first device connector and the second device connector is less than a threshold value, e.g., 95% of the total charge capacity of the attached devices. The first set of LEDs 108 may emit a white color to indicate to a user of the attached first and/or second devices that the charge is less than the threshold value, e.g., 95% of the total charge capacity of the attached devices. The threshold value may range from 85%-95%. In some implementations, the first set of LEDs 108 may turn on when the device connected has a charge between 85%-100% if the threshold value is 85% or between 95%-100% if the threshold value is 95%. The different set of LEDs may include a set of 1, 2, 4 or any other number of LEDs in each set.

When the voltage driven through the non-inverting input ports of the one or more amplifiers is less than the voltage driven through the inverting input ports, a second set of photodiodes emit light of a second color. For example, when the voltage driven through the non-inverting input ports of the amplifiers 104, 106 is less than the resulting output voltage of 13.5 mV that is outputted by the voltage divider 112, a second set of LEDs 110 turns on. The voltage at the non-inverting input ports being less than the resulting output voltage of 13.5 mV indicates that the total charge of the attached first and second devices to the first device connector and the second device connector is greater than a threshold value, e.g., 95% of the total charge capacity of the attached devices. The second set of LEDs 110 may emit a blue color to indicate to a user of the attached first and second devices that the charge is greater than the threshold value, e.g., 95% of the total charge capacity of the attached devices. In some implementations, the second set of LEDs 110 may turn on when the device connected has a charge between 0%-84%% if the threshold value is 85% or between 0%-94% if the threshold value is 95%.

FIG. 9 is an illustration of a car charging device 900. The car charging device 900 may have a dual USB device connector to charge one or more devices. The car charging device 900 includes a housing 902, the power sensing circuit 100 having one or more device connectors, one or more electrical contacts, and an LED power indicator 920.

The housing 902 houses the power sensing circuit 100. The power sensing circuit 100 includes the two device connectors 102*a-b*, the first set and second set of LEDs 108, 110 and the controller 500. The housing 902 has a front surface 904 and a body 910. The body 910 may be frusto-conical or cylindrical. The front surface 904 and the body 910 form a cavity within the housing 902 that encloses the power sensing circuit 100 including the device connectors 102*a-b* and the first set and second set of LEDs 108, 110. The front surface 304 may have two recessed regions 906, 908 where the two device connectors 102*a-b*, such as a dual USB connector 102, are exposed. The front surface 904 may have one or more icons, such as an icon 918, etched, molded, embossed or debossed into the front surface 904. The body 910 has three openings that expose three electrical contacts 912, 914 and 916. The three electrical contacts 912, 914 and 916 electrically connect to a power source, such as a vehicle outlet, when the car charging device 900 is inserted into the vehicle outlet.

The LED power indicator 920 may be positioned between the front surface 904 of the housing 902 and the body 910 of the housing 902. The LED power indicator 920 may be a transparent ring around the edge of the body 910 of the housing 902. The LED power indicator 920 surrounds the first set and second set of LEDs 108, 110 such that when the first set or the second set of LEDs 108, 110 are turned on the light emitted from the first set or the second set of LEDs 108, 110 illuminates through the LED power indicator 920.

Figure 10A:
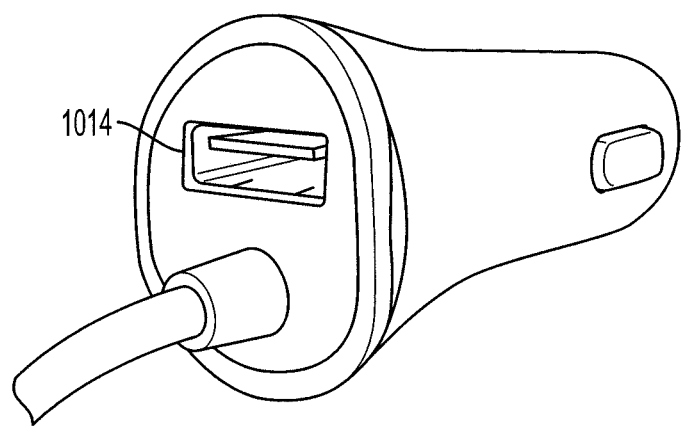
FIGS. 10A-10B shows an example car charging device with a connected cable and different device connectors according to an aspect of the invention.
Figure 10B:
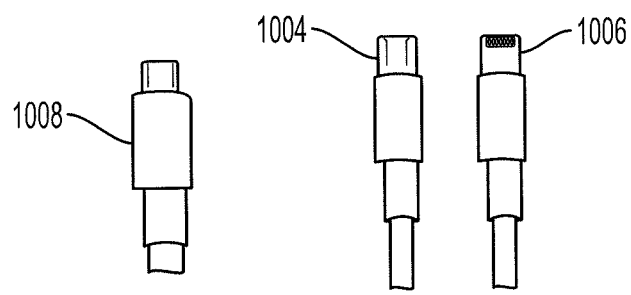

In some implementations, the car charging device has a USB connector 1014 and one of a lightning cable connector 1006, a USB-C connector 1008 or a micro-USB cable connector 1004 to charge one or more devices, as shown in FIGS. 10A-B, for example.

Figure 11:
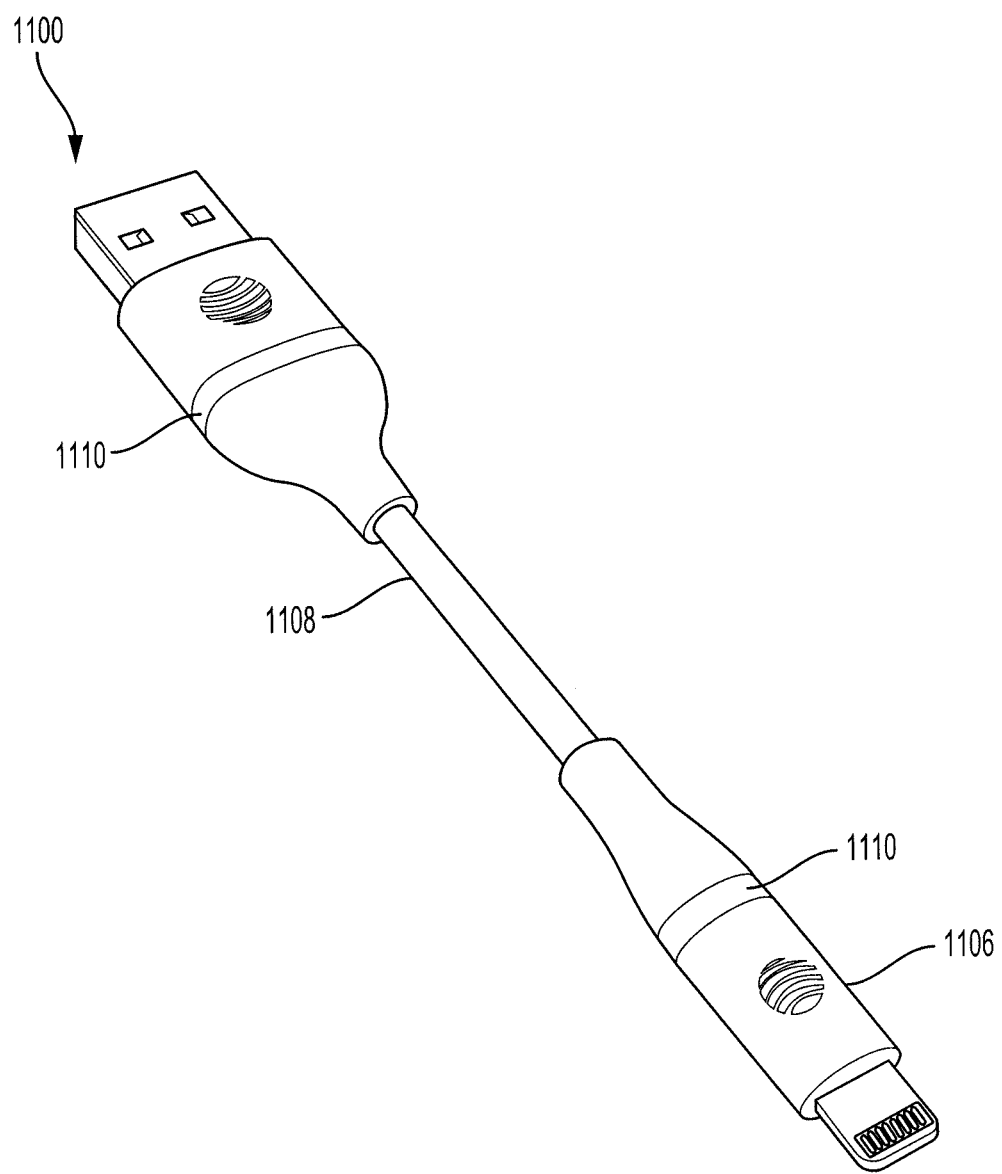
FIG. 11 shows an example charging cable according to an aspect of the invention.

FIG. 11 is an illustration of a charging cable 1100. The charging cable 1100 has one or more housings 1106, a cable portion 1108 and one or more LED power indicators 1110. The charging cable 1100 electrically connects the charging device to the charger. The one or more housings 1106 may house a power sensing circuit, such as the power sensing circuit 1200 of FIG. 12, and a device connector, such as a USB connector, a USB-C connector, a lightning cable connector, or a micro-USB cable connector. The one or more housings 1106 may be made of aluminum and prevent bending of the device connector within the housing. The one or more housings 1106 may be positioned on opposite ends of the charging cable 1100 connected by a cable portion 1108. The cable portion 1108 may be braided and may flexible but resistant to bending. The one or more LED power indicators 1110 may form a transparent ring adjacent to one or more housings 1106 and emit light based on the charge of the connected device when one of the device connectors at the end of the charging cable is inserted into a device and a device connector of a charging device, such as a car charger.

The first and second set of LEDs 108, 110 may illuminate different colors through the LED power indicators 1110 based on the charge of the one or more connected devices. For example, when a device is connected to one of the device connectors and the charge of the device is less than a threshold value, e.g., the charge is less than 95%, the first set of LEDs 108 emit a first color, such as a white color, that indicates that the charge of the connected device is not fully charged. When the charge is greater than or equal to the threshold value, e.g., greater than or equal to 95% charged, the second set of LEDs 110 emit a second color, such as a blue color, that indicates that the connected device is fully charged. The threshold value for the charge of the device that causes the LEDs to emit a particular color of light may vary depending on the device. The threshold value for the charge of the device may be between 85%-95%.

Figure 12:
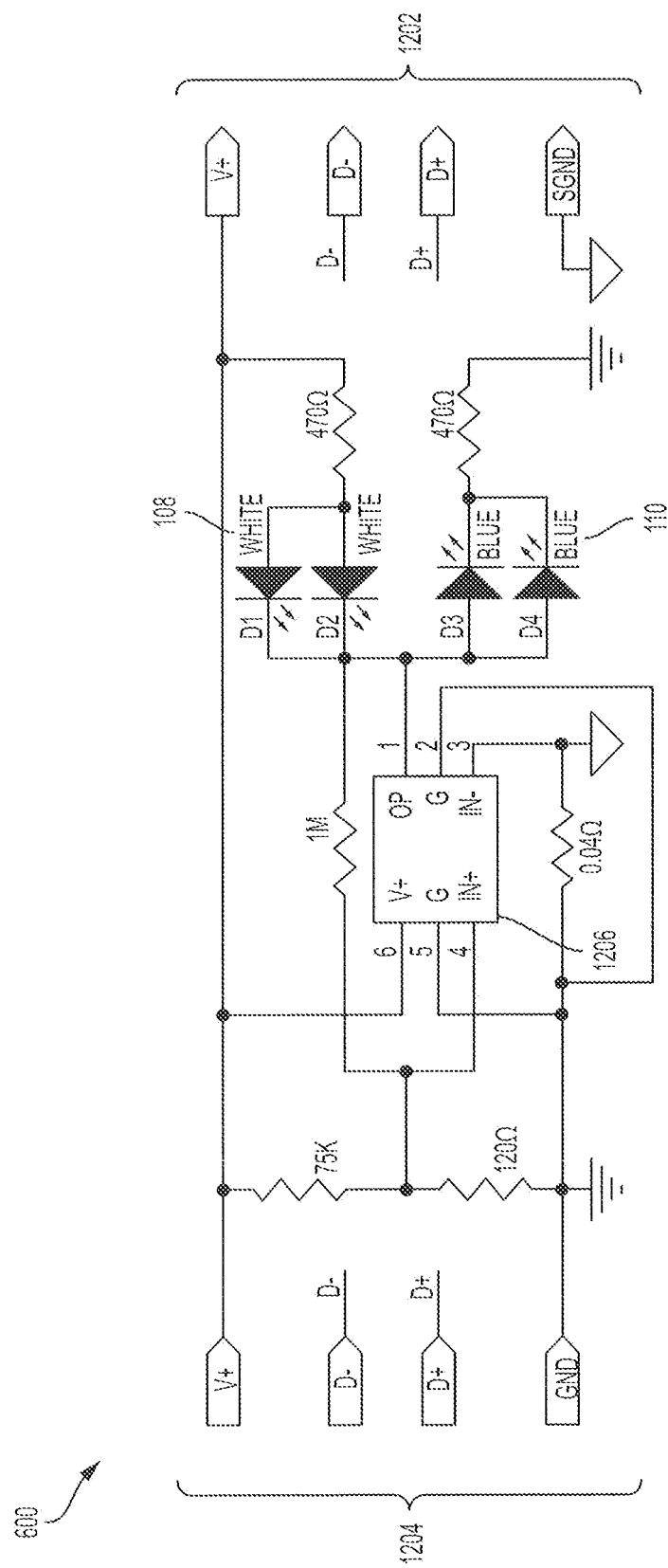
FIG. 12 shows an example circuit diagram of a power sensing and indication circuit for a charging cable according to an aspect of the invention.

FIG. 12 is a circuit diagram of a power sensing and indication circuit ("cable power sensing circuit") 1200 for a charging cable, such as the charging cable 1100. The cable power sensing circuit 1200 may include any, all or none of the components described in the power sensing circuit 100. The cable power sensing circuit 1200 has one or more device connectors, e.g., two device connectors 1202, 1204. The two device connectors 1202, 1204 are on opposite ends of the cable power sensing circuit 1200. The first device connector 1202 is connected to a device that is being charged, such as a tablet, mobile device or other personal device, and the second device connector 1204 to the charger, e.g., the power sensing circuit 100 of the charger. The cable power sensing circuit 1200 electrically connects the charger to the charging device.

Figure 13A:
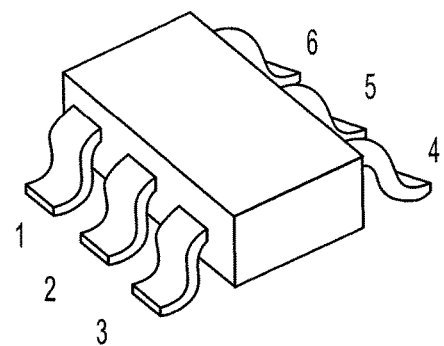
FIG. 13A shows an example integrated circuit of the power sensing and indication circuit of FIG. 12 according to an aspect of the invention.
Figure 13B:
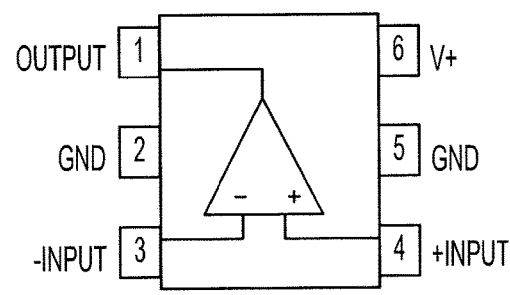
FIG. 13B shows the pin connections of the integrated circuit of FIG. 13A according to an aspect of the invention.
Figure 13C:
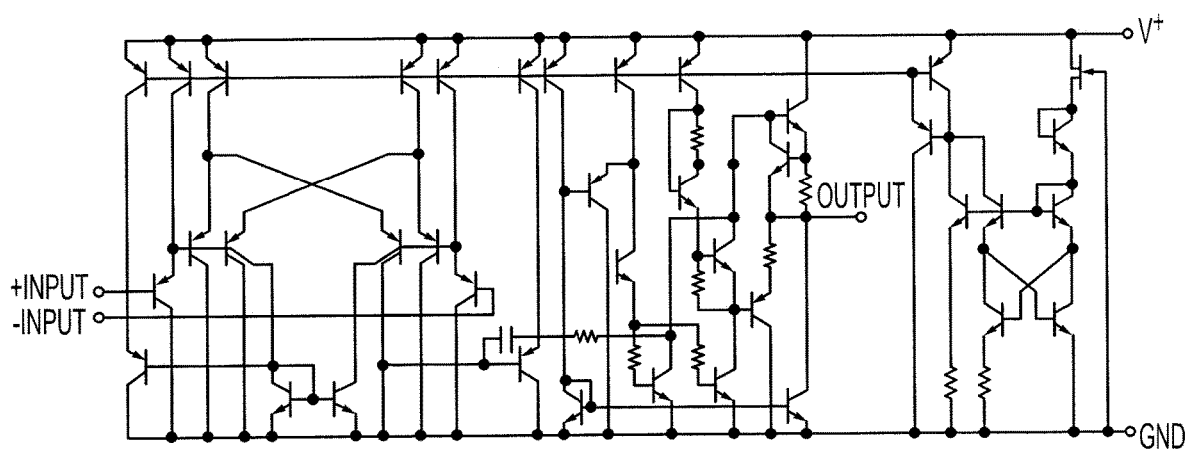
FIG. 13C shows a block diagram of the integrated circuit of FIG. 13A according to an aspect of the invention.

The cable power sensing circuit 1200 includes the multiple sets of LEDs 108, 110 and an integrated circuit 1206. The integrated circuit 1206 has a first input pin (IN+) and a second input pin (IN−). The integrated circuit 1206 compares the voltage at the first input pin to the voltage at the second input pin. If the voltage at the first input pin is greater than the voltage at the second input pin, the first set of LEDs 108 is activated and a first color, such as a white color, is illuminated. If the voltage at the first input pin is greater than the voltage at the second input pin, the second set of LEDs 110 is activated and a second color, such as a blue color, is illuminated. In some implementations, the integrated circuit 1206 activates the first set of LEDs 108 when the voltage at the first input pin is less than the voltage at the second input pin, and activates the second set of LEDs 110 when the voltage at the first input pin is greater than the voltage at the second input pin. The voltage at the second input pin may be a threshold value, e.g., 13.5 mV. The threshold value may vary. An example of the integrated circuit 1206 is shown in FIGS. 13A-C.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A power sensing and indication circuit, comprising:
   a first device connector coupled to a first output voltage port of a controller and configured to charge a first device that is coupled to the first device connector;
   a second device connector coupled to a second output voltage port of the controller and configured to charge a second device that is coupled to the second device connector;
   a first amplifier having an inverting input port, a non-inverting input port and an output port, the non-inverting input port of the first amplifier being connected to the first device connector;
   a first plurality of photodiodes configured to emit light of a first color;
   a second plurality of photodiodes configured to emit light of a second color; and
   at least one of a transistor or a digital circuit coupled to the first plurality of photodiodes and the second plurality of photodiodes and configured to cause the first plurality of photodiodes to emit light of the first color or the second plurality of photodiodes to emit light of the second color based on a comparison of a first voltage of the first device or a second voltage of the second device to a threshold voltage value that varies depending on a first control signal received from the first device being coupled to the first device connector or a second control signal received from the second device being coupled to the second device connector.

2. The power sensing and indication circuit of claim 1, wherein the first device connector has a first pin and a second pin and the second device connector has a first pin and a second pin, wherein the non-inverting input port of the first amplifier is connected to the second pin of the first device connector.

3. The power sensing and indication circuit of claim 1, wherein at least one of the first device connector or the second device connector is a universal serial bus (USB) connector, lightning USB connector, a micro-USB connector or a USB Type-C(USB-C) connector.

4. The power sensing and indication circuit of claim 3, wherein a cable connects the USB connector, the lightning USB connector, the micro-USB connector or the USB-C connector with the controller.

5. The power sensing and indication circuit of claim 1, wherein the threshold voltage value is a first voltage value when the first device is coupled to the first device connector and the threshold voltage value is a second voltage value when the second device is coupled to the second device connector.

6. The power sensing and indication circuit of claim 5, wherein the threshold voltage value is the first voltage value and the first plurality of photodiodes emits light of the first color when the first voltage is greater than or equal to the first voltage value, and wherein the second plurality of photodiodes emit light of the second color when the first voltage is less than the first voltage value.

7. The power sensing and indication circuit of claim 5, wherein the second voltage value is different than the first voltage value.

8. The power sensing and indication circuit of claim 1, further comprising:
   a second amplifier having an inverting input port, a non-inverting input port and an output port, wherein the non-inverting input port of the second amplifier is connected to the second device connector.

9. The power sensing and indication circuit of claim 6, wherein the at least one of the transistor or the digital circuit is a transistor, wherein the transistor is connected to the output port of the first amplifier or the output port of the second amplifier.

10. The power sensing and indication circuit of claim 9, wherein the non-inverting input port of the first amplifier has a first voltage, the inverting input port of the first amplifier has a first voltage value, the non-inverting input port of the second amplifier has a second voltage and the inverting input port of the second amplifier has a second voltage value.

11. The power sensing and indication circuit of claim 10, Wherein the first plurality of photodiodes emits light of the first color when the first voltage is greater than the first voltage value.

12. The power sensing and indication circuit of claim 10, wherein the second plurality of photodiodes emits light of the second color when the first voltage is less than the first voltage value.

13. The power sensing and indication circuit of claim 10, wherein the first voltage value is 12.1 mV.

14. A power sensing and indication device for charging devices, comprising:
   a controller for providing a charge to a device and having an input voltage port, a first output voltage port and a second output voltage port; and
   a power sensing and indication circuit including:
   a first device connector coupled to the first output voltage port and configured to charge a first device;
   a second device connector coupled to the second output voltage port and configured to charge a second device;
   an amplifier having an inverting input port, a non-inverting input port and an output port, the non-inverting input port of the amplifier being connected to the first device connector;
   a first plurality of photodiodes configured to emit light of a first color;
   a second plurality of photodiodes configured to emit light of a second color; and
   a transistor configured to cause the first plurality of photodiodes to emit light of the first color or the second plurality of photodiodes to emit light of the second color based on a comparison of a first voltage of the first device or a second voltage of the second device to a threshold voltage value that is a first voltage value based on a first control signal received when the first device is coupled to the first device connector and a second voltage value based on a second control signal received when the second device is coupled to the second device connector.

15. The power sensing and indication device of claim 14, further comprising a cable connecting the first device connector with the controller.

16. The power sensing and indication device of claim 14, wherein the first device connector has a third pin and a fourth pin, the third pin and the fourth pin being configured to transmit and receive data.

17. The power sensing and indication device of claim 14, wherein the first device connector is a Universal Serial Bus (USB) connector, a lightning USB connector, a USB Type-C (USB-C) connector or a micro-USB connector.

18. The power sensing and indication device of claim 14, wherein the inverting input port of the amplifier is connected to an output of a voltage divider and has the first voltage value.

19. The power sensing and indication device of claim 14, wherein the first plurality of photodiodes emits light of the first color when the first voltage is greater than the first voltage value.

20. A power sensing and indication circuit, comprising:
a first device connector coupled to a first output voltage port of a controller and configured to charge a first device that is coupled to the first device connector;
a second device connector coupled to a second output voltage port of the controller and configured to charge a second device that is coupled to the second device connector;
a first amplifier having an inverting input port; a non-inverting input port and an output port; the non-inverting input port of the first amplifier being connected to the first device connector;
a first plurality of photodiodes configured to emit light of a first color;
a second plurality of photodiodes configured to emit light of a second color; and
at least one of a transistor or a digital circuit coupled to the first plurality of photodiodes and the second plurality of photodiodes and configured to cause the first plurality of photodiodes to emit light of the first color or the second plurality of photodiodes to emit light of the second color based on a comparison of a first voltage of the first device or a second voltage of the second device to a threshold voltage value that is approximately 12.1 mV based on a first control signal received from the first device being coupled to the first device connector or a second control signal received from the second device being coupled to the second device connector.

* * * * *